United States Patent [19]

Kato et al.

[11] 4,141,959

[45] Feb. 27, 1979

[54] PROCESS FOR REMOVING NITROGEN OXIDES FROM COMBUSTION FLUE GAS

[75] Inventors: Akira Kato; Shinpei Matsuda; Shigeo Uno; Youichi Sakuta; Fumito Nakajima, all of Ibaraki; Hiroshi Kagabu, Tokyo, all of Japan

[73] Assignee: Hitachi, Ltd. and Babcock-Hitachi Kabushiki Kaisha, Tokyo, Japan

[21] Appl. No.: 853,491

[22] Filed: Nov. 21, 1977

[30] Foreign Application Priority Data

Nov. 19, 1976 [JP] Japan .............................. 51-138507

[51] Int. Cl.$^2$ .................... B01D 53/34; B01J 23/92
[52] U.S. Cl. ................. 423/239; 252/411 S; 423/244
[58] Field of Search ............... 423/239, 244; 252/411, 252/411 S

[56] References Cited

U.S. PATENT DOCUMENTS

| | | | |
|---|---|---|---|
| 4,003,711 | 1/1977 | Hishinuma et al. | 423/239 A X |
| 4,043,939 | 8/1977 | Kasaoka | 252/411 S |
| 4,044,102 | 8/1977 | Muraki et al. | 423/239 A |
| 4,070,305 | 1/1978 | Obayashi et al. | 252/411 S |

FOREIGN PATENT DOCUMENTS 1154008  6/1969  United Kingdom ..................... 423/244

*Primary Examiner*—G. O. Peters
*Attorney, Agent, or Firm*—Thomas E. Beall, Jr.

[57] ABSTRACT

Ammonia is added to combustion flue gas containing nitrogen and sulfur oxides and the gas is brought into contact with a catalyst which contains titanium or tin oxide, or a mixture of the two, as a main component at a temperature between 150 ~ 330° C.

Nitrogen oxides are reduced to nitrogen and water, and sulfur oxides are deposited as ammonium sulfates, on the surface of the catalyst which causes a decrease in the ability of the catalyst.

A part of the catalyst is removed continuously or intermittently from a catalyst bed and fed to a regeneration tower where it is treated with a hot gas having a temperature of 350 ~ 600° C. The ammonium sulfates deposited on the catalyst are decomposed into $SO_3$ and $NH_3$. The $SO_3$ is adsorbed by an $SO_3$ absorbent and the $NH_3$ is returned to the combustion flue gas to be treated.

5 Claims, 1 Drawing Figure

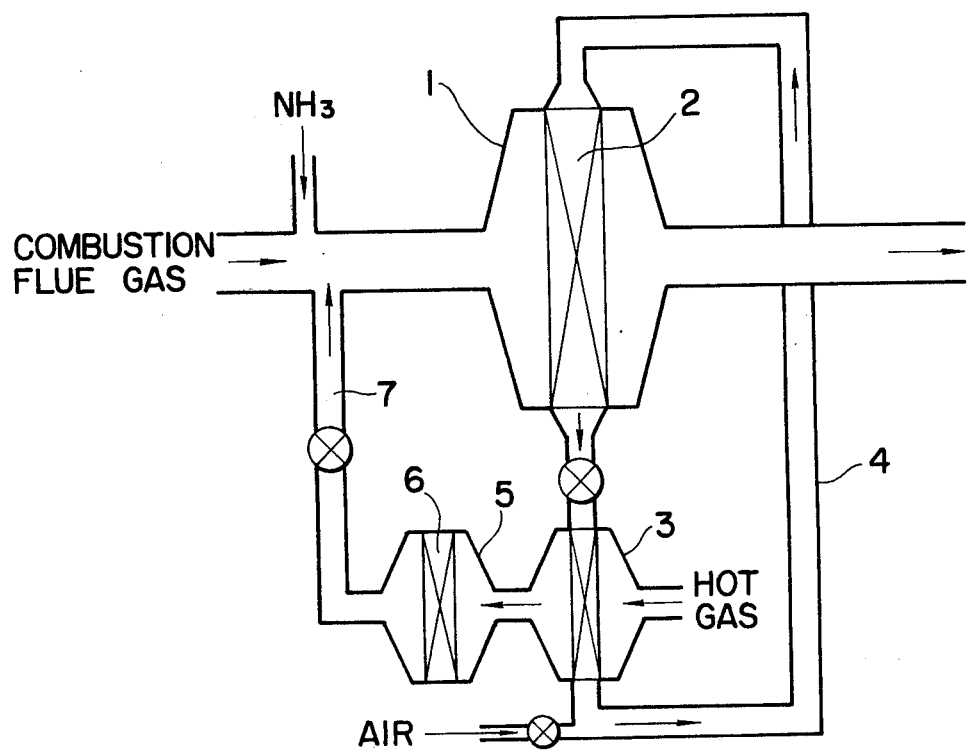

PROCESS FOR REMOVING NITROGEN OXIDES FROM COMBUSTION FLUE GAS

BACKGROUND OF THE INVENTION

1. Field of the Invention

This invention relates to a process for the removal of noxious nitrogen oxides NOx from combustion flue gases which contain sulfur oxides ($SO_2$, $SO_3$) as well as nitrogen oxides. Nitrogen oxides in combustion flue gas are catalytically reduced to nitrogen and water at a relatively low temperature in the presence of sulfur oxides, especially sulfur trioxide, in a reaction with ammonia, which is added to the flue gas.

2. Description of the Prior Art

Several processes for the removal of nitrogen oxides from combustion flue gas have been developed in recent years. The most promising process is a catalytic process in which a NOx-containing gas is put in contact with a catalyst and NOx is reduced to nitrogen and the water in a reaction with ammonia. Usually the reaction is carried out at 200° ~ 450° C. In cases where the combustion flue gas contains rather high concentrations of sulfur oxides, there are several problems with the process.

The most serious problem is the accumulation of ammonium sulfate [$(NH_4)_2SO_4$] and ammonium bisulfate ($NH_4HSO_4$) (hereafter referred to collectively as ammonium sulfates) on the surface of the catalyst employed, which necessarily results in a decrease in and some times a loss of ability of the catalyst. From an economical point of view the reaction is preferably carried out at lower temperatures. However the deposition of ammonium sulfates, is more serious at lower temperatures, especially those below 330° C., because the vapor pressure of ammonium sulfates is low.

The formation of ammonium sulfates is expressed as follows.

$$NH_3 + SO_3 + H_2O \rightarrow NH_4HSO_4 \quad (1)$$

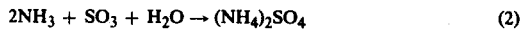

$$2NH_3 + SO_3 + H_2O \rightarrow (NH_4)_2SO_4 \quad (2)$$

The concentration of sulfur trioxide is said to be 1 ~ 10% of that of the total sulfur oxides in a flue gas. Therefore, if the concentration of SOx is 1,000 ppm, the concentration of $SO_3$ is 10 ~ 100 ppm.

In the catalytic reduction of NOx at lower temperatures if ammonia is added to a flue gas, the formation of ammonium sulfates are inevitable. The deposition of ammonium sulfates readily occurs in the micropores of the catalysts, because of the phenomenon called "capillary condensation", which occurs in those micropores. For the reasons stated above, the catalytic reduction of NOx with $NH_3$ is usually carried out at temperatures above 350° C.

A process for the regeneration of catalyst which have become inactive because of the deposition of ammonium sulfates has also been proposed under Japanise laid-open of patent application No 51-3366 (1976) "Process for removing of nitrogen oxides" where the catalysts are heated to high temperatures, 400° ~ 600° C., and the deposited ammonium sulfates are vaporised. There are several problems associated with this process.

(1) In the regeneration process a high concentration of ammonium sulfates is discharged into the atmosphere, which presents the possibility of secondary pollution. Therefore, equipment to remove the ammonium sulfates must be installed.

(2) In the NOx reduction process, a catalyst which comprises an alumina carrier and active components, for example V, Cu, and Fe is usually employed. When the catalyst is heated to 400° ~ 600° C. in the presence of ammonium sulfates, alumina is converted to aluminum sulfate and/or ammonium aluminum sulfate, resulting in a decrease in catalytic activity.

(3) Ammonia, which is the NOx reducing agent, is lost in the formation of ammonium sulfates. The lost ammonia accounts for about 10% of the ammonia utilized in the reduction of NOx.

SUMMARY OF THE INVENTION

An object of the present invention is to provide a process which removes NOx at a low temperature from combustion flue gas containing a rather high concentrations of SOx.

Another object is to provide a process which decomposes ammonium sulfates accumulated on the catalyst and regenerates the catalyst effectively. A further object is to provide a process which absorbes $SO_3$ into an $SO_3$ absorbent generated during the decomposition of the ammonium sulfates and introduces ammonia generated during the decomposition to untreated combustion flue gas.

To attain the above objects, a process of the invention comprises the following steps:

(a) Nitrogen oxides which are contained in combustion flue gas are reduced to nitrogen and water by reacting with ammonia, in contact with catalyst.

(b) Sulfur oxides are deposited as ammonium sulfates, on the surface of the catalyst at a temperature between 150° ~ 330° C.

(c) Ammonium sulfates deposited on the catalyst are heated to vaporize the ammonium sulfates thereby forming ammonia and $SO_3$ which is absorbed on an $SO_3$ absorbent.

Through these steps, nitrogen oxides and sulfur oxides are removed from combustion flue gas and the catalyst which is used for NOx-reduction keeps its activity at high level.

BRIEF DESCRIPTION OF DRAWING

The FIGURE is a schematic flow diagram of a system for carring out the present invention.

DESCRIPTION OF THE PREFERRED EMBODIMENT

In the FIGURE, (a) A combustion flue gas to which $NH_3$ has been added is put in contact with a catalyst 2. NOx is reduced to $N_2$ and $H_2O$ by reacting with the $NH_3$ at a temperature between 150° ~ 330° C. in a NOx reduction reactor 1.

(b) The catalytic activity of the catalyst employed decreases after a certain period of time. A part of the catalyst is removed from the reactor either continuously or intermittently. The catalyst removed is treated with a hot gas 8 in a regeneration tower 3 to vaporize the ammonium sulfates deposited on the catalyst surface.

(c) The hot gas containing ammonium sulfates is introduced in an $SO_3$ absorption tower 5 where $SO_3$ is removed selectively by an $SO_3$ absorbent 6.

(d) The hot gas containing NH$_3$ 7 from the SO$_3$ absorption tower is mixed with the flue gas prior to the latter's entering the NOx reduction reactor.

(e) The regenerated catalyst from the regeneration tower 3 is recycled to the NOx reduction reactor 1 through a catalyst recirculation line 4.

The NOx reduction catalysts used in the present invention comprises one or more oxides from each of the following two groups of oxides: (1) TiO$_2$ and SnO$_2$, and (2) Cu, V, Cr, Mo, W, Mn, Fe, Co, Ni, Ce and U.

The catalyst should preferably be composed of 50 ~ 88 atom% or more preferably, 80 ~ 98 atom% of the oxides in group (1); the catalyst should preferably include an oxide of Cu, Fe, V, Mo or W, or a mixture of these, from group (2).

NOx reduction with NH$_3$ is carried out between 150° and 330° C., preferably between 200° and 330° C. The reaction of nitric oxide with NH$_3$ in the presence of oxygen is represented by $$NO + NH_3 + 1/4 O_2 \rightarrow N_2 + 3/2 H_2O \quad (3)$$

The NH$_3$ to NOx ratio in flue gases entering the NOx reduction reactor 1 is adjusted to between 0.7 and 1.2 (mole ratio).

During operation of the NOx reduction plant, the activity of the catalyst gradually decreases because of the deposition of ammonium sulfates. When the activity of a catalyst decreases to an unacceptable level, a part or all of the catalyst is removed from the catalyst bed 2 and fed to the regeneration tower 3. In the regeneration tower 3 the deactivated catalyst is treated with a hot gas having a temperature of 350° ~ 600° C., preferably 375° ~ 600° C. The duration of the treatment depends on the temperature and space velocity of the hot gas. The higher the temperature (600° C. ~ 400° C.) of the hot gas, the shorter the duration (0.5 ~ 5 hrs) is. The space velocity of the hot gas should be 100 ~ 10,000 V/V/h, preferably 100 ~ 1,000 V/V/h. The hot gas preferably contains oxygen, most preferably more than 10% oxygen. The deactivated catalyst can be removed from the reactor 1 continuously or intermittently. The regenerated catalyst is recycled to the NOx reduction reactor 1. The hot gas from the regeneration tower 3, which contains NH$_3$ and SO$_3$, enters the sulfur trioxide absorption tower 5 which is filled with an SO$_3$ absorbent 6. The SO$_3$ absorbent used in the present invention includes oxides of alkaline and alkaline earth metals and oxides of transition metals which form stable sulfates in the temperature range 350° ~ 600° C. Preferable SO$_3$ absorbents are oxides of calcium, iron, and copper. TiO$_2$-CuO, Fe$_2$O$_3$ or mixtures are also used as regeneratable SO$_3$ absorbents. The reaction of SO$_3$ with the absorbent is usually very fast in the above temperature range.

The hot gas from the SO$_3$ absorption tower 5, which contains ammonia, is mixed with the flue gases entering the NOx reduction reactor 1. Thus, ammonia which is consumed in the formation of ammonium sulfates is utilized in the reduction of NOx.

The present invention will be described in detail by reference to illustrative examples.

EXAMPLE 1

(1) Preparation of a catalyst (TiO$_2$-V$_2$O$_5$)

500 g of a slurry of methatitanic acid (containing 150 g of TiO$_2$) and 11.6 g of ammonium methavanadate were mixed. 500 g of distilled water was added to this first mixture, and the resulting second mixture was thoroughly kneaded with a kneader. This kneaded mixture was dried at 140° C. for a day, and the resulting dried mixture was admixed with 3% by weight of graphite powder. This third mixture was then molded under a pressure of about 500 kg/cm$^2$ to obtain pellets 6 mm in diameter and 6 mm thick. The pellets were then calcined at 450° C. for 3 hours. The thus prepared catalyst had a composition of TiO$_2$ and V$_2$O$_5$ in a molar ratio of 1:0.026. The pellets were ground to 10 to 20 mesh particles.

(2) Treatment of a gas with the catalysts

The testing apparatus used was the type known as normal-pressure static bed. The catalyst was charged in a reactor tube made of quartz glass with an inner diameter of 16 mm. A thermo-couple, which was placed in a protective quartz glass tube, was provided for measuring the reaction temperature within the catalyst bed. The reactor tube was heated by an electric furnace to raise the temperature of catalyst. The volume of the catalyst bed was 4 ml. The Gas of the following composition was passed through the reactor tube at a space velocity of 50,000 V/V/h.

| NO | 290 | — | 310 | ppm |
|---|---|---|---|---|
| NH$_3$ | 290 | — | 360 | ppm |
| SO$_2$ | 450 | — | 550 | ppm |
| SO$_3$ | 15 | — | 25 | ppm |
| O$_2$ | 2 | — | 4 | % |
| CO$_2$ | 10 | — | 13 | % |
| H$_2$O | 12 | — | 16 | % |
| N$_2$ | | bal | | |

The reaction temperature was maintained at 250° C. for 18 hours. The temperature was held at 400° C. for 2 hours to decompose the ammonium sulfates deposited on the catalyst. In this way the catalysts were regenerated. This cycle was repeated five times.

NOx was measured with a chemiluminescence type NOx analyzer. The results are shown in Table 1. In the tables, NOx decomposition rate (%) is represented as follows:

NOx decomposition rate (%) =

$$\frac{\text{amount of } NOx \text{ at an inlet} - \text{amount of } NOx \text{ at an outlet}}{\text{amount of } NOx \text{ at an inlet}} \times 100$$

Table 1

| Cycle | 1 | | 2 | | 3 | | 4 | | 5 | | | | | |
|---|---|---|---|---|---|---|---|---|---|---|---|---|---|---|
| Reaction time (hr) | 1 | 20 | 22 | 25 | 44 | 46 | 49 | 68 | 70 | 73 | 92 | 94 | 97 | 116 |
| Reaction temperature (° C) | 250 | 250 | 400 | 250 | 250 | 400 | 250 | 250 | 400 | 250 | 250 | 400 | 250 | 250 |
| NOx decompositon rate (%) | 91 | 84 | 99 | 90 | 82 | 99 | 91 | 82 | 99 | 89 | 83 | 99 | 90 | 83 |

EXAMPLE 2

The catalyst used was the same as in Example 1. The gas composition was the same as in Example 1, except for $SO_3$. The $SO_3$ concentration was 5 ppm in this case. The reaction temperature was maintained at 250° C. for 18 hours. Afterwards, the temperature was held at 375° C. for 2 hours. This cycle was repeated five times. The results are shown in Table 2.

Table 2

| Cycle | 1 | | 2 | | | 3 | | | 4 | | | 5 | | |
|---|---|---|---|---|---|---|---|---|---|---|---|---|---|---|
| Reaction time (hr) | 1 | 20 | 22 | 25 | 44 | 46 | 49 | 68 | 70 | 73 | 92 | 94 | 97 | 116 |
| Reaction temperature (° C) | 250 | 250 | 375 | 250 | 250 | 375 | 250 | 250 | 375 | 250 | 250 | 375 | 250 | 250 |
| NOx decomposition rate (%) | 92 | 88 | 99 | 91 | 87 | 99 | 90 | 87 | 99 | 91 | 86 | 99 | 91 | 87 |

EXAMPLE 3

Instead of the methatitanic acid used in Example 1, methastannic acid was used as a starting material. The catalyst was prepared in the same manner as in Example 1. The $SnO_2$ and $V_2O_5$ in the catalyst were in a molar ratio of 1:0.026. The gas treatment was conducted under the same conditions as in Example 1, and the results shown in Table 3 were obtained.

Table 3

| Cycle | 1 | | 2 | | | 3 | | | 4 | | | 5 | | |
|---|---|---|---|---|---|---|---|---|---|---|---|---|---|---|
| Reaction time (hr) | 1 | 20 | 22 | 25 | 44 | 46 | 49 | 68 | 70 | 73 | 92 | 94 | 97 | 116 |
| Reaction temperature (° C) | 250 | 250 | 400 | 250 | 250 | 400 | 250 | 250 | 400 | 250 | 400 | 400 | 250 | 250 |
| NOx decomposition rate (%) | 92 | 85 | 99 | 91 | 83 | 99 | 91 | 84 | 99 | 90 | 84 | 99 | 91 | 83 |

EXAMPLE 4

500 g of an aqueous solution of titanium tetrachloride ($TiCl_4$) was diluted with one liter of distilled water. The resulting solution was titrated slowly into a 1 N NaOH solution to precipitate titanium hydroxide. The final pH of the solution containing the precipitate was adjusted to 7. The precipitate was decanted with distilled water, and filtered. The decanted precipitate was mixed with 46.6 g of ammonium molybdate (($NH_4)_6Mo_7O_{24} \cdot 4H_2O$) and 16.0 g of ammonium methavanadate ($NH_4VO_3$), and the mixture was thoroughly kneaded with a kneader. The paste was then dried at 300° C. for 5 hours, and the resulting dried mixture was admixed with 3% by weight of graphite powder. This second mixture was then molded under about 500 kg/cm² to obtain pellets 6 mm in diameter and 6 mm thick. The pellets were then calcined at 450° C. for 3 hours. The composition of the catalyst was $TiO_2:MoO_3:V_2O_5$ = 1:0.10:0.026 molar ratio. The pellets were ground to 10 ~ 20 mesh particles. The composition of the gas was the same as in Example 2. The reaction temperature was maintained at 200° C. and the regeneration temperature was maintained at 450° C. The reaction was carried out at SV = 10,000 V/V/h. The results are shown in Table 4.

Table 4

| Cycle | 1 | | 2 | | | 3 | | | 4 | | | 5 | | |
|---|---|---|---|---|---|---|---|---|---|---|---|---|---|---|
| Reaction time (hr) | 1 | 20 | 22 | 25 | 44 | 46 | 49 | 68 | 70 | 73 | 92 | 94 | 97 | 116 |
| Reaction temperature (° C) | 200 | 200 | 450 | 200 | 200 | 450 | 200 | 200 | 450 | 200 | 200 | 450 | 200 | 200 |
| NOx decomposition rate (%) | 93 | 87 | 99 | 90 | 85 | 99 | 91 | 86 | 99 | 92 | 86 | 99 | 92 | 86 |

COMPARATIVE EXAMPLE 1

500 g of aluminum nitrate (Al $(NO_3)_3 \cdot 9H_2O$) were dissolved in one liter of distilled water. Enough 3-normal ammonia water to neutralize the solution and produce a precipitate was then added. This precipitate was mixed with 7.77 g of methavanadate. The mixture was treated as the mixture in Example 1 to obtain Comparative Catalyst-1, which had a composition of $Al_2O_3:V_2O_5$ = 1:0.05. This catalyst was subjected to a reaction similar to that in Example 1. The results are shown in Table 5.

Table 5

| Cycle | 1 | | 2 | | | 3 | | | 4 | | | 5 | | |
|---|---|---|---|---|---|---|---|---|---|---|---|---|---|---|
| Reaction Time (hr) | 1 | 20 | 22 | 25 | 44 | 46 | 49 | 68 | 70 | 73 | 92 | 94 | 97 | 116 |
| Reaction Temperature (° C) | 250 | 250 | — | 250 | 250 | — | 250 | 250 | — | 250 | 250 | — | 250 | 250 |
| Regeneration Temperature | — | — | 400 | — | — | 400 | — | — | 400 | — | — | 400 | — | — |

Table 5-continued

| Cycle | 1 | | | 2 | | | 3 | | | 4 | | | 5 | |
|---|---|---|---|---|---|---|---|---|---|---|---|---|---|---|
| (° C) NOx Decomposition Rate (%) | 81 | 68 | 89 | 77 | 62 | 87 | 73 | 60 | 84 | 70 | 56 | 82 | 67 | 51 |

We claim:

1. A catalytic process for removing NOx from combustion flue gas which contains SOx and oxygen comprising
   (a) adding ammonia to said combustion flue gas
   (b) contacting said combustion flue gas and ammonia with a catalyst at a temperature of between 150° and 330° C. to reduce NOx and to deposit ammonium sulfates on said catalyst,
   (c) removing a part of said catalyst from the catalyst bed to a regeneration tower,
   (d) heating the catalyst at a temperature between 350° and 600° C. to decompose said deposited ammonium sulfates to ammonia and sulfur trioxide,
   (e) absorbing said sulfur trioxide on to a solid absorbent,
   (f) adding ammonia formed from the decomposition of said ammonium sulfates to untreated combustion flue gas, and
   (g) returning said catalyst treated at the regneration tower through a catalyst recirculation line to the catalyst bed.

2. The process according to claim 1 in which the catalyst comprises at lease one oxide from each of the following two groups of oxides (1) titanium and tin, and (2) copper, vanadium, chromium, molybdeum, tungsten, manganese, iron, cobalt, nickel, cerium and uranium.

3. The process according to claim 2 in which said catalyst is composed of 50 ~ 99 atom % of the oxide in group (1) titanium and tin.

4. The process according to claim 1 in which said solid absorbent for sulfur trioxide comprises at least one oxide of a metal selected from the group consisting of calcium, iron and copper.

5. The process according to claim 1 in which said solid absorbent for sulfur trioxid comprises a member or members selected from the group consisting of titanium, oxide, copper oxide and iron oxide.

* * * * *